United States Patent [19]

Wright

[11] 4,028,957

[45] June 14, 1977

[54] RACK AND PINION STEERING UNIT

[76] Inventor: Cecil Edward Wright, 8 Prospect Court, Chula Vista, Calif. 92011

[22] Filed: Oct. 31, 1975

[21] Appl. No.: 627,552

[52] U.S. Cl. .................................. 74/422; 74/498; 280/96

[51] Int. Cl.² .......................................... B62D 3/12

[58] Field of Search ............. 74/422, 498; 180/148; 280/96

[56] References Cited

UNITED STATES PATENTS

| | | | |
|---|---|---|---|
| 743,013 | 11/1903 | Mott | 280/96 |
| 1,360,518 | 11/1920 | Funk | 74/498 |
| 1,872,714 | 8/1932 | Farley | 180/148 |
| 2,579,195 | 12/1951 | Kurtz et al. | 74/422 X |
| 2,781,037 | 2/1957 | Vuncannon | 74/422 X |
| 3,157,061 | 11/1964 | Parker | 74/422 X |

FOREIGN PATENTS OR APPLICATIONS 1,066,382  4/1967  United Kingdom ................. 74/498

Primary Examiner—Allan D. Herrmann
Attorney, Agent, or Firm—Brown & Martin

[57] ABSTRACT

A housing for rack and pinion gears incorporates a downward facing slot. The rack slides on a bearing surface above the slot and includes a centrally mounted flange extending downwardly through the slot for mounting tie rod ends. The pinion gear is carried in a bushing and bearing and engages the upper gear tooth surface of the rack. Extremes of travel of the rack are accommodated by flexible boots covering the open ends of the housing.

4 Claims, 5 Drawing Figures

RACK AND PINION STEERING UNIT

BACKGROUND OF THE INVENTION

The advantages of rack and pinion steering for vehicles have long been recognized. Steering precision and reduction in objectionable steering forces are among those advantages for which rack and pinion steering units are utilized. Rack and pinion steering is particularly desirable in high performance vehicles.

In a typical rack and pinion steering unit according to the prior art, an elongated flat rack is engaged with a pinion gear. The steering shaft is connected to the pinion gear so that steering movements are converted into rotation of the pinion gear and a reciprocal translation of the rack. The rack is normally horizontal and is connected at its outer ends through tie rods and steering arms to the wheels of the vehicle. In many applications, the position of the steering unit is considerably above the terminus of the steering arm so that the resulting tie rods are relatively short and angulated upwardly to connect between the steering arm and rack ends. As the vehicle negotiates an uneven surface, such as in off-road racing, the steering wheels of the vehicle move through the full range of vertical travel permitted by the suspension system. Because of the short and highly angulated tie rods, vertical travel of the wheel causes an undesired steering movement of the wheel. These steering movements degrade the performance of the vehicle and introduces objectionable feedback forces through the steering unit and steering shaft to the steering wheel and driver. At high speeds, this so-called bump steering effect can make it extremely difficult to maintain control of the vehicle.

Therefore, it is desirable to have a rack and pinion steering unit that reduces the undesired steering movements of the steered wheels of the vehicle during vertical suspension movements and reduces undesirable feedback forces transmitted to the driver. Such a steering unit is particularly desirable where it is compact and sufficiently strong to withstand hard use.

SUMMARY OF THE INVENTION

An exemplary embodiment of the steering unit incorporates a housing with subhousings for the pinion gear and rack. The steering unit may be mounted to the vehicle frame or other fixed vehicle structure in association with the steered wheels of the vehicle.

The rack subhousing is in an elongated configuration with open ends and a downward facing elongated opening. The downward facing opening is partially closed by a rack bearing plate. Vertical forces on the rack are absorbed on the upper surface of the rack bearing plate. The rack reciprocally translates along the rack bearing plate, and at its extremes of travel, extends beyond the open ends of the rack subhousing. Flexible boots cover the open ends of the rack subhousing thereby allowing a minimum length subhousing to accommodate full rack travel.

A flange is secured to the lower edge of the rack and extends through an elongated slot in the bearing plate. Tie rod ends are secured to the flange in closely spaced relationship so that tie rods of maximum length may be utilized. Since the rods are much longer than those that could be accommodated in a steering unit with tie rods mounted on the ends of the rack, the undesirable feedback forces are greatly reduced. In addition, the longer effective radius of the tie rods reduces distortions in the steering geometry with vertical movement of the wheel. Thus, whereas conventional rack and pinion steering units may cause severe toe-in on full compression of the suspension system, in the instant invention, this toe-in is considerably reduced.

The pinion gear is received in a pinion subhousing that provides two spaced bearing support points for absorption of forces transmitted to and from the pinion gear. The first bearing point is a ball bearing mounting immediately adjacent one side of the gear portion of the pinion gear. The second bearing point is a bushing immediately adjacent the opposite side of the gear portion on the pinion gear. The bearing and bushing receive a shaft that extends through the gear portion.

It is therefore an object of the invention to provide a new and improved rack and pinion steering unit that is high in strength.

It is another object of the invention to provide a new and improved rack and pinion steering unit that requires little maintenance in use.

It is another object of the invention to provide a new and improved rack and pinion steering unit that reduces undesired steering movements with vertical suspension movement.

It is another object of the invention to provide a new and improved rack and pinion steering unit that reduces the transmission of undesirable forces to the driver.

It is another object of the invention to provide a new and improved rack and pinion steering unit with a minimum length rack housing.

It is another object of the invention to provide a new and improved rack and pinion steering unit with a high strength bearing mounting for the pinion gear.

It is another object of the invention to provide a new and improved rack and pinion steering unit that accommodates maximum length tie rods.

It is another object of the invention to provide a new and improved rack and pinion steering unit that is relatively light in weight.

It is another object of the invention to provide a new and improved rack and pinion steering unit that provides precise steering control of a vehicle.

It is another object of the invention to provide a new and improved rack and pinion steering unit that is adaptable to a wide range of vehicle configurations.

Other objects and many attendant advantages of the invention will become more apparent upon a reading of the following detailed description together with the drawings, in which like reference numerals refer to like parts throughout and in which.

DETAILED DESCRIPTION OF THE DRAWINGS

Figure 1:
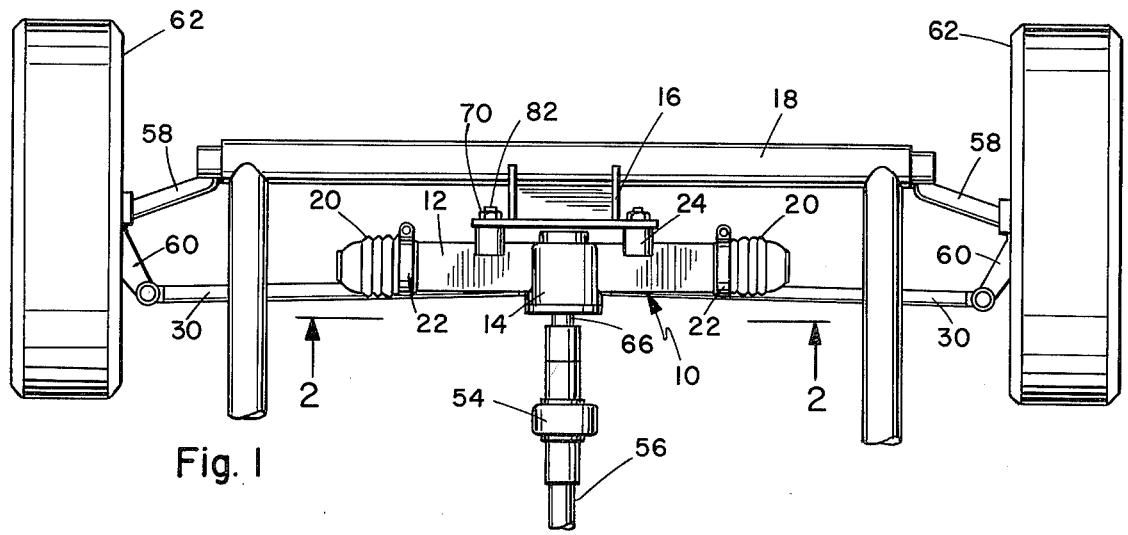
FIG. 1 is a top plan view of the steering unit and vehicle suspension system.
Figure 2:
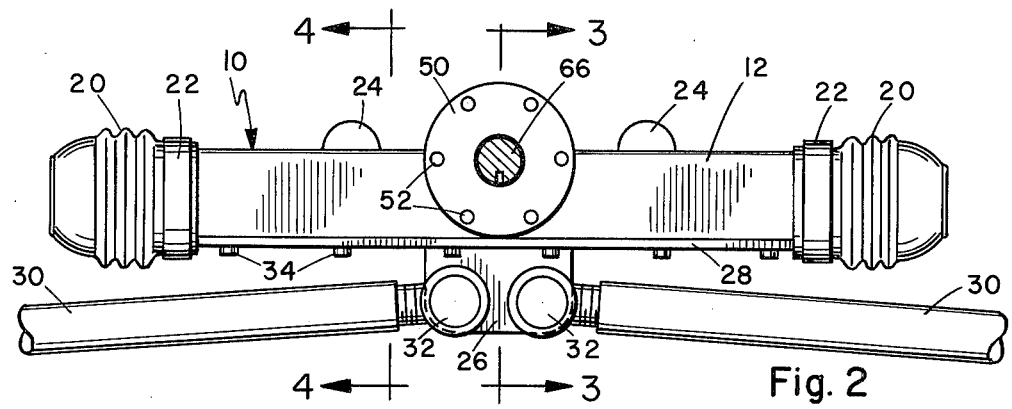
FIG. 2 is a sectional view taken on line 2—2 of FIG. 1.

Referring now to the drawings and particularly FIGS. 1 and 2, there is illustrated a housing 10 for the rack and pinion and steering unit. The housing incorporates a rack subhousing 12 and a pinion subhousing 14. A pair of mounting pads 24 incorporate studs 82. An adapter bracket 16 is secured to the pads 24 by the studs 82 and nuts 70. In the illustrated embodiment, an adapter support bracket 16 is welded to a frame tube 18. In other applications, adapter brackets for securing the unit to the floor pan or other appropriate structure may be employed. The frame tube 18 also mounts the radius arms 58 which provide for vertical suspension travel of the wheel and tires 62. Steering movement of the wheels 62 is actuated through steering arms 60 which are connected to the steering unit through tie rods 30. The steering wheel of the vehicle (not shown) is connected via a steering shaft 56 and universal joint 54 to the pinion shaft 66 on the steering unit.

Figure 4:
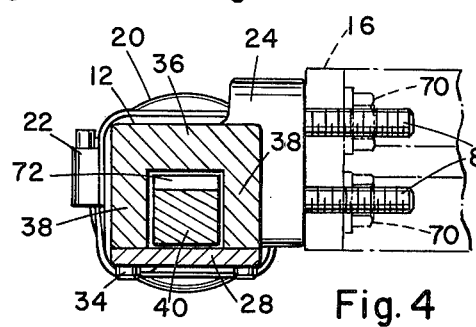
FIG. 4 is a sectional view taken on line 4—4 of FIG. 2.

Referring now particularly to FIGS. 2 and 4, the rack subhousing 12 is a generally U-shaped casting incorporating a horizontal top section 36 and depending sides 38. The open ends of the subhousing 12 are closed by flexible boots 20 secured to the subhousing 12 by clamps 22. The downward facing elongated opening of the housing is closed by a bearing plate 28. Plate 28 is secured to the housing by a plurality of screw fasteners 34. The subhousing 12 and bearing plate 28 together form a generally rectangular cross-sectional cavity in which an elongated rack 40 is accommodated. The bearing plate 28 incorporates an elongated slot 42. A flange 26 is secured to the downward facing surface of the rack 40 and extends through the slot 42 in the bearing plate 28. The rack is restrained horizontally by the depending side walls 38 and is supported vertically in bearing relationship with the bearing plate 28.

Figure 5:
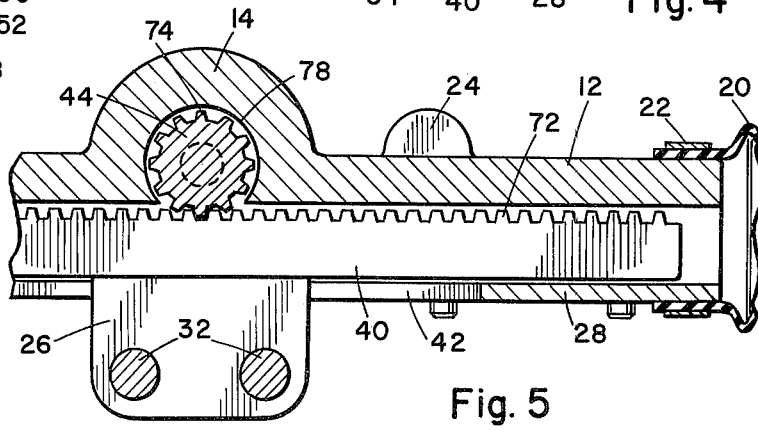
FIG. 5 is a sectional view taken on line 5—5 of FIG. 3.

FIG. 5 illustrates the relationship of the rack 40 to the pinion gear 44. The upper surface of the rack 40 comprises a plurality of gear teeth 72 which engage the gear teeth 74 on the pinion gear 44. Thus, vertically upward forces on the rack are transmitted to the pinion gear 44. Vertically downward forces are transmitted to bearing plate 28.

The rack 40, pinion gear 44 and bearing plate 28 are all comprised of a high strength alloy to absorb the high loads encountered. 4130 steel alloy has been found to be suitable for this purpose.

Figure 3:
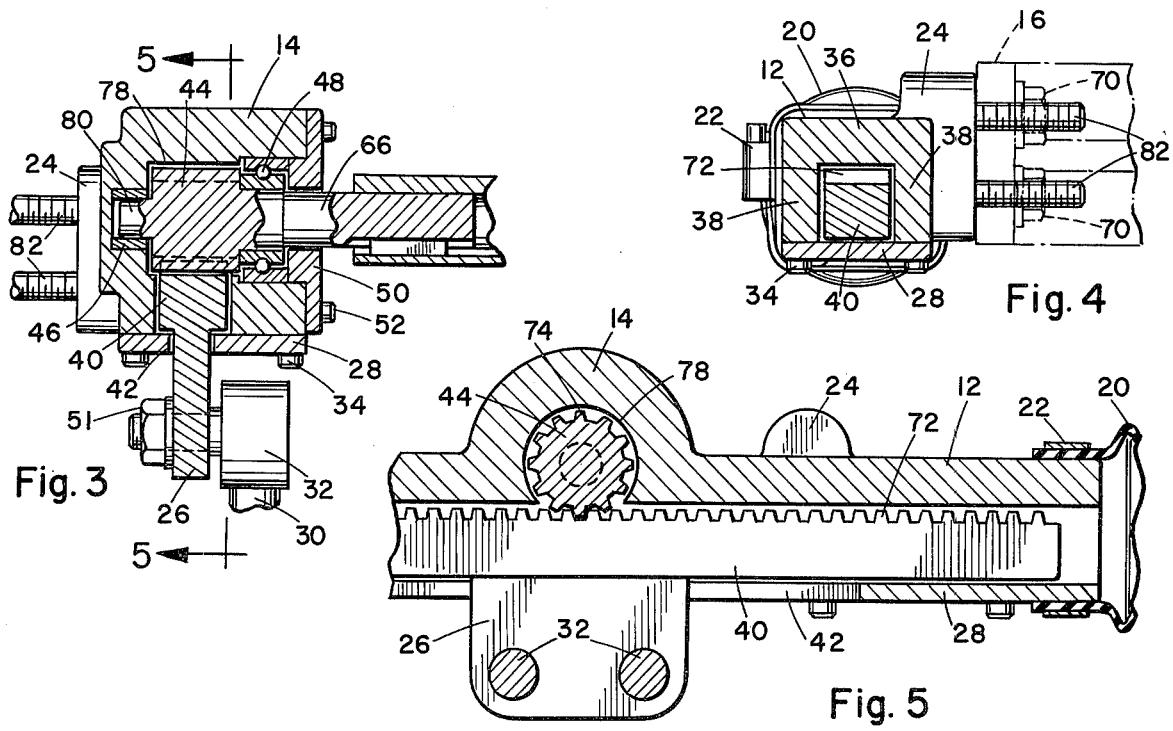
FIG. 3 is a sectional view taken on line 3—3 of FIG. 2.

The relationship between the tie rods 30 and flange 26 is illustrated in FIGS. 2 and 3. The flange 26 extends from the central portion of the rack 40 and joins the tie rods 30 in closely spaced relationship. The tie rods 30 are terminated with tie rod ends 32 which are received through a pair of bores in the flange 26 and secured by fasteners 51. Also illustrated in FIGS. 2 and 3 are the details of the pinion subhousing 14. The pinion subhousing 14 incorporates a central bore 78 sized to receive the pinion gear 44. The shaft portion 66 of the pinion gear extends through the pinion gear to a terminal stub 80. The pinion gear 44 is mounted for rotation by a first bearing 48 on shaft 66 and by a supplemental bearing in the form of bushing 46 cooperating with the stub 80 of the gear shaft. The unit is held in assembled relationship by a closure plate 50 secured to the subhousing 14 by a plurality of fasteners 52.

In use, the long tie rods 30 incorporated into the invention produce a relatively low angulation despite the vertical movements of the wheels 62 on radius arms 58. Therefore, there is little tendency for toe-in to develop on maximum downward vertical excursion of the vehicle on the suspension system. The forces that are generated by the movement of the vehicle over uneven surfaces are absorbed by the rugged structure of the suspension unit including the large and vertical bearing surface provided by bearing plate 28 and the dual bearing configuration of the pinion gear 44. The size of the rack subhousing 12 is kept to a minimum by the use of flexible boots 20 so that during maximum steering excursions the rack 40 may protrude into a boot 20 but during opposite excursions, the boot 20 may be compressed by contact with other portions of the vehicle without interferring with the operation of the steering unit.

Having described my invention, I now claim:

1. A rack and pinion steering unit for mounting on the front end of a vehicle and connected to the steering shaft of the vehicle comprising:
    housing means adapted for mounting between the steered wheels of a vehicle,
    a pinion gear rotatably mounted in said housing means,
    a rack adapted to be driven by the steering shaft of the vehicle mounted in said housing means for engagement with said pinion gear and for reciprocal translation within said housing means,
    said housing means comprising an elongated rack sub-housing receiving said rack and having a downwardly facing elongated opening,
    said rack sub-housing including a bearing plate having an elongated slot mounted at the lower terminal portion of said elongated sub-housing and having a substantial bearing area in contact with said rack,
    tie rod mounting means for connection to two tie rods for transmitting the translational movements of said rack into steering movements into the steered wheels of said vehicle,
    said tie rod mounting means for being positioned substantially equidistant between the steered wheels of a vehicle and for mounting substantially equal length tie rods,
    said tie rod mounting means comprising a flange depending substantially vertically downwardly from the central, lower surface of said rack and through said slot in said bearing plate.

2. The rack and pinion steering unit according to claim 1 wherein:
    said rack subhousing has open ends,
    said rack extends beyond said open ends at the extremes of said reciprocal translation,
    and flexible elongated boots received over said open rack sub-housing ends.

3. The rack and pinion steering unit according to claim 1 wherein:
    said housing means additionally comprises a pinion sub-housing incorporating a bearing for rotation of said pinion gear.

4. The rack and pinion steering unit according to claim 3 wherein:
    said pinion gear comprises a gear portion and a shaft extending from both sides of said gear portion,
    a first end of said shaft being mounted in said bearing and the second side of said shaft being mounted in a bushing received in said pinion sub-housing.

* * * * *